(12) United States Patent
Susitaival et al.

(10) Patent No.: US 9,900,902 B2
(45) Date of Patent: Feb. 20, 2018

(54) RADIO BASE STATION, WIRELESS DEVICE, AND METHODS THEREIN

(71) Applicant: Telefonaktiebolaget LM Ericsson (publ), Stockholm (SE)

(72) Inventors: Riikka Susitaival, Helsinki (FI); Fredrik Gunnarsson, Linköping (SE); Niklas Johansson, Sollentuna (SE); Magnus Stattin, Upplands Väsby (SE); Stefan Wager, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 47 days.

(21) Appl. No.: 15/024,479

(22) PCT Filed: Jun. 17, 2014

(86) PCT No.: PCT/SE2014/050736
§ 371 (c)(1),
(2) Date: Mar. 24, 2016

(87) PCT Pub. No.: WO2015/047152
PCT Pub. Date: Apr. 2, 2015

(65) Prior Publication Data
US 2016/0227561 A1 Aug. 4, 2016

Related U.S. Application Data

(60) Provisional application No. 61/883,267, filed on Sep. 27, 2013.

(51) Int. Cl.
*H04W 72/12* (2009.01)
*H04W 28/02* (2009.01)

(52) U.S. Cl.
CPC ... *H04W 72/1252* (2013.01); *H04W 28/0278* (2013.01); *H04W 72/1284* (2013.01)

(58) Field of Classification Search
CPC ......... H04W 28/0278; H04W 72/1252; H04W 72/1284
(Continued)

(56) References Cited

U.S. PATENT DOCUMENTS 9,060,293 B1 * 6/2015 Vivanco .............. H04W 52/262
2009/0125650 A1 * 5/2009 Sebire ................... H04L 1/003
710/57

(Continued)

FOREIGN PATENT DOCUMENTS

WO WO 2013/113390 8/2013

OTHER PUBLICATIONS

3GPP TS 36.321 v11.0.0; Technical Specification; 3rd Generation Partnership Project; Technical Specification Group Radio Access Network; Evolved Universal Terrestrial Radio Access (E-UTRA); Medium Access Control (MAC) protocol specification (Release 11)—Sep. 2012.

(Continued)

*Primary Examiner* — Robert Lopata
(74) *Attorney, Agent, or Firm* — Baker Botts LLP

(57) ABSTRACT

Embodiments herein relate to method in a wireless device (10) for handling data transmissions in a radio communications network (1). The wireless device (10) is served by a first radio base station (12) and a second radio base station (13) providing dual connectivity to the wireless device (10) in the radio communications network (1). The wireless device (10) evaluates whether a trigger condition for buffer status reporting is fulfilled. When the trigger condition is fulfilled, the wireless device (10) transmits a buffer status report to the first radio base station and/or the second radio base station.

8 Claims, 11 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2011/0143765 | A1* | 6/2011 | Moulsley | H04W 72/1252 455/450 |
| 2011/0242972 | A1* | 10/2011 | Sebire | H04L 67/06 370/229 |
| 2011/0310937 | A1* | 12/2011 | Lin | H04L 5/001 375/219 |
| 2013/0107722 | A1* | 5/2013 | Huang | H04W 28/12 370/241 |
| 2014/0022933 | A1* | 1/2014 | Yi | H04W 24/02 370/253 |
| 2014/0126399 | A1* | 5/2014 | Damnjanovic | H04W 72/1252 370/252 |
| 2014/0302853 | A1* | 10/2014 | Militano | H04W 36/0055 455/436 |
| 2014/0348105 | A1* | 11/2014 | Rosa | H04W 72/1284 370/329 |
| 2015/0009923 | A1* | 1/2015 | Lei | H04W 72/0413 370/329 |
| 2015/0327116 | A1* | 11/2015 | Zhang | H04W 72/1284 370/329 |
| 2015/0358838 | A1* | 12/2015 | Wei | H04W 24/04 370/228 |

OTHER PUBLICATIONS

PCT International Search Report for International application No. PCT/SE2014/050736—dated Nov. 26, 2014.

PCT Invitation to Pay Additional Fees and, Where Applicable, Protest Fee for International application No. PCTG/SE2014/050736—dated Oct. 6, 2014.

PCT International Preliminary Report on Patentability for International application No. PCT/SE2014/050736—dated Jan. 18, 2016.

3GPP TSG-RAN WG2 Meeting #82; Fukuoka, Japan; Source: Renesas Mobile Europe; Title: Protocol impact of dual connectivity for UE and eNB (R2-131847)—May 20-24, 2013.

3GPP TSG-RAN WG2 Meeting #83; Barcelona, Spain; Source: Renesas Mobile Europe; Title: On protocol stack impacts of dual connectivity (R2-132405)—Aug. 19-23, 2013.

3GPP TSG RAN WG2 Meeting #83; Barcelona, Spain; Source: Intel Corporation; Title: MAC layer aspects for dual connectivity (R2-132817)—Aug. 19-23, 2013.

3GPP TSG-RAN WG2 Meeting #83bis; Ljubljana, Slovenia; Source: Ericsson; Title: Uplink scheduling and BSRs with dual connectivity (R2-133412)—Oct. 7-11, 2013.

PCT Written Opinion of the International Searching Authority for International application No. PCT/SE2014/050736—dated Nov. 26, 2014.

* cited by examiner

RADIO BASE STATION, WIRELESS DEVICE, AND METHODS THEREIN

PRIORITY

This nonprovisional application is a U.S. National Stage Filing under 35 U.S.C. §371 of International Patent Application Serial No. PCT/SE2014/050736 filed Jun. 17, 2014, and entitled "Radio Base Station, Wireless Device, And Methods Therein" which claims priority to U.S. Provisional Patent Application No. 61/883,267 filed Sep. 27, 2013, both of which are hereby incorporated by reference in their entirety.

TECHNICAL FIELD

Embodiments herein relate to a first radio base station, a wireless device and method therein. In particular for handling data transmissions in a radio communications network.

BACKGROUND

In a typical cellular radio system, wireless devices, also known as mobile stations and/or user equipments (UEs), communicate via a radio access network (RAN) to one or more core networks. The wireless devices can be mobile stations or user equipments (UE) such as mobile telephones ("cellular" telephones) and laptops with wireless capability (e.g., mobile termination), and thus can be, for example, portable, pocket, hand-held, computer-included, or car-mounted mobile devices which communicate voice and/or data via radio access network.

The radio access network (RAN) covers a geographical area which is divided into cell areas, with each cell area being served by a base station, e.g., a radio base station (RBS), which in some networks is also called "NodeB" or "eNodeB". A cell is a geographical area where radio coverage is provided by the radio base station equipment at a base station site. Each cell is identified by an identity within the local radio area, which is broadcast in the cell. The radio base stations communicate over the air interface operating on radio frequencies with the wireless device within range of the radio base stations.

In some versions, particularly earlier versions, of the radio access network, several radio base stations are typically connected, e.g., by landlines or microwave, to a radio network controller (RNC). The RNC, also sometimes termed a base station controller (BSC), supervises and coordinates various activities of the plural radio base stations connected thereto. The RNCs are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UTRAN is essentially a radio access network using wideband code division multiple access for wireless devices. The Third Generation Partnership Project (3GPP) has undertaken to evolve further the UTRAN and GSM based radio access network technologies.

Long Term Evolution (LTE) is a variant of a 3GPP radio access technology wherein the radio base stations are connected directly to a core network rather than to RNCs. In general, in LTE the functions of an RNC are performed by the radio base stations. As such, the radio access network (RAN) of an LTE system has an essentially "flat" architecture comprising radio base stations without reporting to RNCs.

The following description, for purposes of explanation, refers to LTE, WCDMA, UTRAN or E-UTRAN. This does however not limit the applicability to other technologies.
Dual Connectivity for e.g. LTE With the proliferation of user friendly smart phones and tablets, the usage of high data rate services such as video streaming over the radio communications network is becoming commonplace, greatly increasing the amount of traffic in radio communications networks. Thus, there is a great urgency in the radio communications network community to ensure that the capacity of radio communications networks keeps up increasing with this ever-increasing user demand. The latest systems such as the LTE, especially when coupled with interference mitigation techniques, have spectral efficiencies very close to a theoretical Shannon limit. The continuous upgrading of current radio communications networks to support the latest technologies and densifying the number of radio base stations per unit area are two of the most widely used approaches to meet the increasing traffic demands.

Yet another approach that is gaining high attention is to use Heterogeneous Networks where the traditional pre-planned macro base stations or macro radio base stations, also known as the macro layer, are complemented with several low-powered base stations or low powered radio base station, such as pico nodes, that may be deployed in a relatively unplanned manner. The 3rd Generation Partnership Project (3GPP) has incorporated the concept of Heterogeneous Networks as one of the core items of study in the latest enhancements of LTE.

In a dual connectivity the idea is that the wireless device keeps connectivity to more than one radio base station at the time. Assuming that the macro radio base stations are able to provide coverage and the pico radio base stations are there only for capacity enhancements, i.e. no coverage holes, one alternative architecture is where the wireless device maintains a macro connectivity all the time, connected to a first radio base station being a Master eNB (MeNB)), and adds a pico connectivity when it is in the coverage area of the second radio base station also referred to as being connected to a Secondary eNB (SeNB)). When both connections are active or set up, the wireless device may get data and/or control signaling from many radio base stations. Dual connectivity to a wireless device from two radio base stations in a radio communications network may in some cases not schedule transmissions in an efficient manner leading to a non optimal use of dual connectivity.

SUMMARY

An object of embodiments herein is to provide a mechanism that enhances the performance of the radio communications network in an efficient manner.

According to an aspect of embodiments herein the object is achieved by a method in a wireless device for handling data transmissions in a radio communications network. The method being characterized in that when the wireless device is served by a first radio base station and a second radio base station providing dual connectivity to the wireless device in the radio communications network the wireless device evaluates whether a trigger condition for buffer status reporting is fulfilled. When the trigger condition is fulfilled, the wireless device transmits a buffer status report to the first radio base station and/or the second radio base station.

According to another aspect of embodiments herein the object is achieved by a method in a first radio base station in a first radio base station for handling data transmissions in a radio communications network. The radio communications network comprises the first radio base station and a second radio base station. The first radio base station receives, when the first radio base station and the second radio base station provide dual connectivity to a wireless device in the radio communications network, a buffer status report from the wireless device. The first radio base station then schedules radio resources to the wireless device based on the received buffer status report by coordinating information associated with the received buffer status report with the second radio base station before scheduling radio resources to the wireless device.

According to yet another aspect of embodiments herein the object is achieved by a wireless device for handling data transmissions in a radio communications network. The wireless device is configured to be served by a first radio base station and a second radio base station providing dual connectivity to the wireless device in the radio communications network. The wireless device is configured, when being served by the first and second radio base station, to evaluate whether a trigger condition for buffer status reporting is fulfilled. When the trigger condition is fulfilled the wireless device is configured to transmit a buffer status report to the first radio base station and/or the second radio base station.

According to still another aspect of embodiments herein the object is achieved by a first radio base station for handling data transmissions in a radio communications network. The radio communications network comprises the first radio base station and a second radio base station, and the first radio base station is configured to receive, when the first radio base station and the second radio base station provide dual connectivity to a wireless device in the radio communications network, a buffer status report from the wireless device. The first radio base station further being configured to schedule radio resources to the wireless device based on the received buffer status report by coordinating information associated with the received buffer status report with the second radio base station before scheduling resources to the wireless device.

Embodiments herein provides a structured and efficient manner of reporting BSR to a network for data transmissions during dual connectivity, resulting in an efficient manner of scheduling transmissions within the radio communications network and thereby enhancing the performance of the radio communications network.

DETAILED DESCRIPTION

Figure 1:
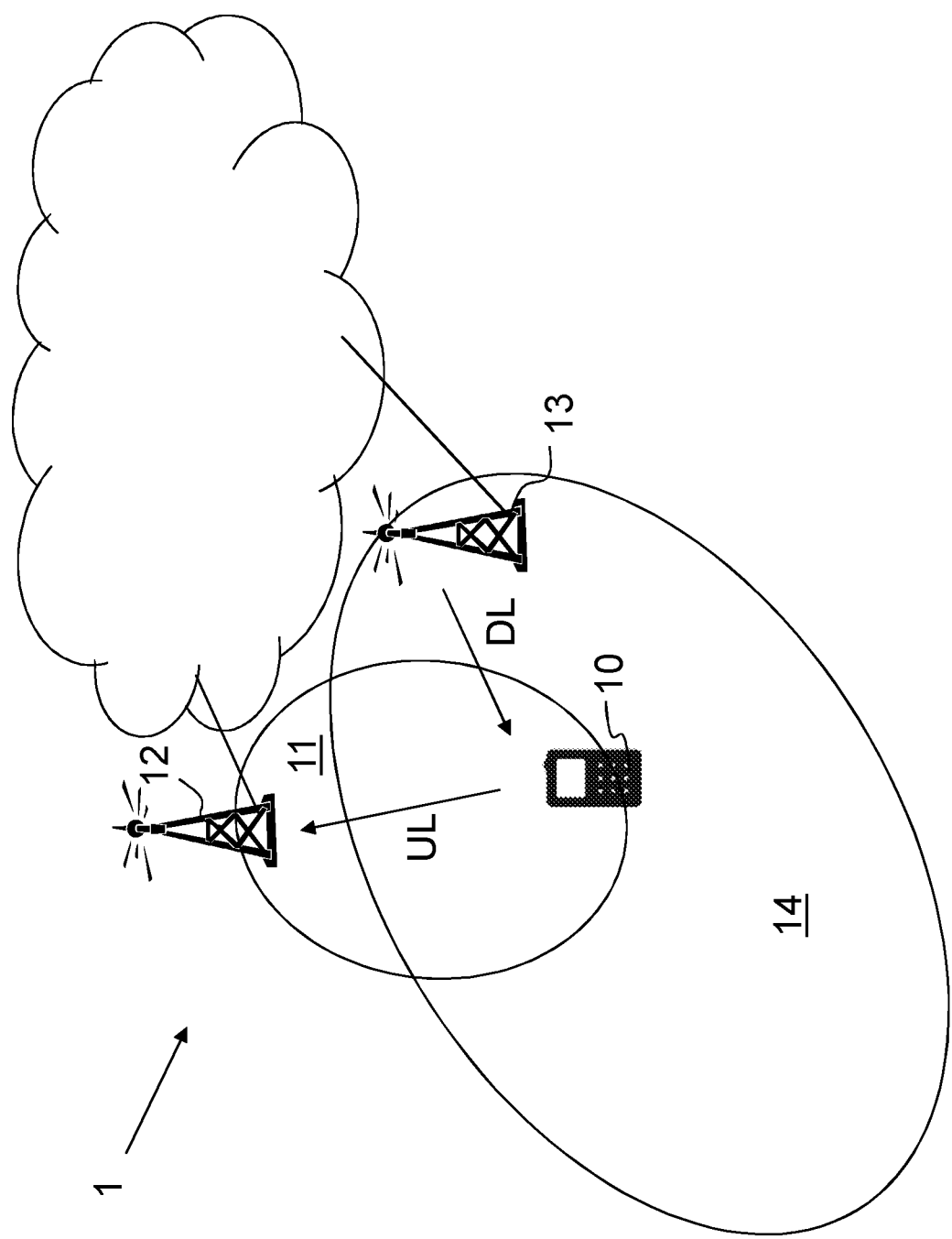
FIG. 1 shows a schematic overview depicting a radio communications network according to embodiments herein.

The embodiments herein relate to radio communications networks in general. FIG. 1 is a schematic overview depicting a radio communications network 1. The radio communications network 1 comprises one or more RANs and one or more CNs. The radio communications network 1 may use a number of different technologies, such as Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. The radio communications network 1 is exemplified herein as an LTE network.

In the radio communications network 1, a wireless device 10, also known as a mobile station, a user equipment and/or a wireless terminal, communicates via a Radio Access Network (RAN) to one or more core networks (CN). It should be understood by the skilled in the art that "wireless device" is a non-limiting term which means any wireless terminal, user equipment, Machine Type Communication (MTC) device, a Device to Device (D2D) terminal, or node e.g. Personal Digital Assistant (PDA), laptop, mobile, sensor, relay, mobile tablets or even a small base station communicating within respective cell.

The radio communications network 1 covers a geographical area which is divided into cell areas, e.g. a cell 11 being served by a radio base station 12. The radio base station 12 may serve one or more cells, such as the cell 11. The radio base station 12 is exemplified herein as a Master radio base station (MeNB) in an LTE system.

A cell is a geographical area where radio coverage is provided by radio base station equipment at a base station site or at remote locations in Remote Radio Units (RRU). The cell definition may also incorporate frequency bands and radio access technology used for transmissions, which means that two different cells may cover the same geographical area but using different frequency bands. Each cell is identified by an identity within the local radio area, which is broadcast in the cell. Another identity identifying the cell 11 uniquely in the whole radio communications network 1 is also broadcasted in the cell 11. The radio base station 12 communicates over the air or radio interface operating on radio frequencies with the wireless device 10 within range of the radio base station 12. The wireless device 10 transmits data over the radio interface to the radio base station 12 in Uplink (UL) transmissions and the radio base station 12 transmits data over an air or radio interface to the wireless device 10 in Downlink (DL) transmissions.

Furthermore, the radio communications network 1 comprises a second radio base station 13. The second radio base station 13 may be a secondary serving radio base station also referred to as a secondary radio base station (SeNB) in an LTE system. The respective radio base station 12,13 may also be referred to as a NodeB, an evolved Node B (eNB, eNode B), a base transceiver station, Access Point Base Station, base station router, or any other network unit capable of communicating with a wireless device within the cell served by the respective radio base station depending e.g. on the radio access technology and terminology used. In the dual connectivity the wireless device 10 receives/transmit different data from the first and second radio base station on a same or different carrier. The wireless device 10 may comprise separate Radio Link Control (RLC) entities and/or Medium Access Control (MAC) entities for different transmission links to respective radio base station.

UL Scheduling in e.g. LTE

Figure 2:
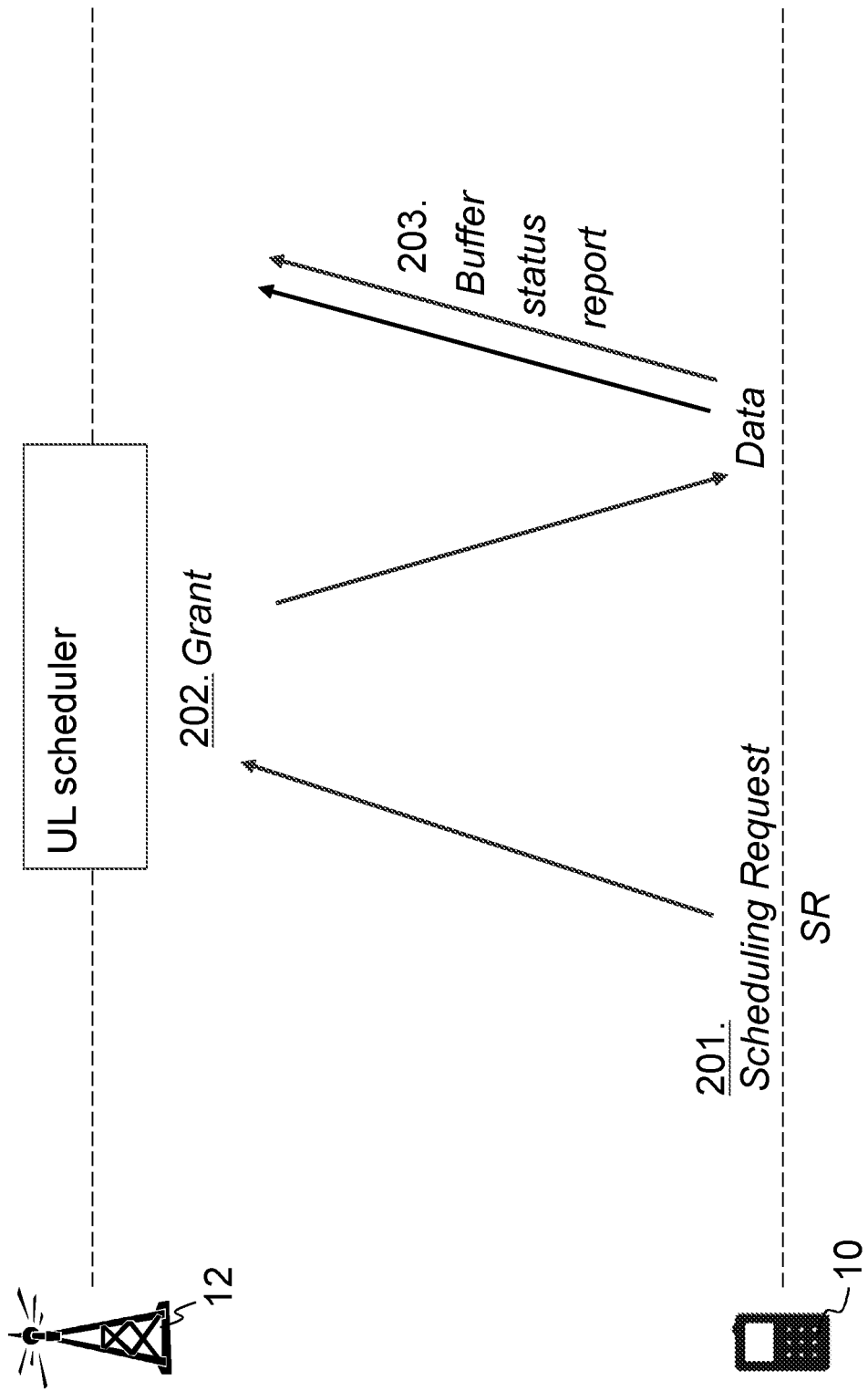
FIG. 2 shows a procedure for a wireless device to request resources for UL data transmission of BSR.

The standard UL scheduling procedure in LTE is shown in FIG. 2. When new data arrives to an empty wireless device buffer or data that belongs to a higher priority logical channel group than existing data, arrives at the wireless device 10, the wireless device 10 triggers a regular Buffer Status Report (BSR) to report a buffer size or amount of data of the wireless device 10. If the wireless device 10 does not have UL resources to transmit the BSR, it triggers a Scheduling Request (SR).

Action 201. The wireless device 10 transmits a SR to the first radio base station 12. The SR may be sent on a dedicated SR channel (D-SR) or on the contention based Random Access Channel if the wireless device 10 is not configured with the D-SR resources on a Physical Uplink Control Channel (PUCCH).

Action 202. When the first radio base station 12 has received the SR, the first radio base station 12 may schedule the wireless device 10 and transmit a grant such as an initial grant.

Action 203. Using the initial grant, the wireless device 10 may finally transmit the BSR with it. In the BSR, a Buffer Size field identifies a total amount of data available for transmission. Reporting may be done per Logical Channel Groups (LCGs) which are configured with a Radio Resource Control (RRC) protocol. Typically Logical Channels having same priority are grouped to one group. All buffered bits on a Radio Link Control (RLC) layer and a Packet Data Convergence Protocol (PDCP) layer are counted for the BSRs.

Dual Connectivity for e.g. LTE

Figure 3:
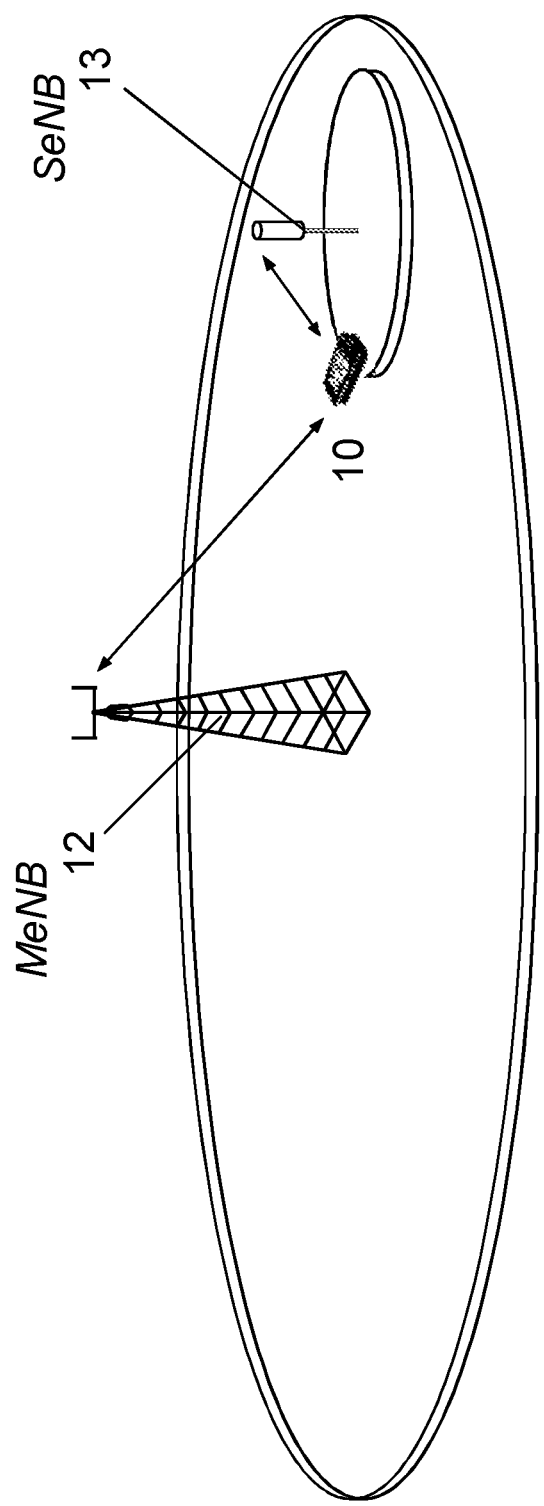
FIG. 3 shows a Dual connectivity operation with wireless device having multiple connections with both an MeNB and an SeNB.

As stated above, in the dual connectivity the idea is that the wireless device 10 keeps connectivity to more than one radio base station at the time. Assuming that the macro radio base stations are able to provide coverage and the pico radio base stations are there only for capacity enhancements, i.e. no coverage holes, one alternative architecture is where the wireless device 10 maintains a macro connectivity all the time, connected to the first radio base station 12 being a Master eNB (MeNB)), and adds a pico connectivity when it is in the coverage area of the second radio base station 13 also referred to as being connected to a Secondary eNB (SeNB)). When both connections are active or set up, the wireless device 10 may get data and/or control signaling from many radio base stations. This is illustrated in FIG. 3. FIG. 3 shows a Dual connectivity operation with the wireless device 10 having multiple connections with both the first radio base station 12 and the second radio base station 13. The MeNB may be the first radio base station 12, as illustrated, but it may be the other way around where the SeNB may be the first radio base station 12.

There are currently different user plane architectures discussed to support the dual connectivity. These may be divided into two categories:

1. Inter-bearer split dual connectivity. In this alternative, data of a single EPS bearer is transmitted over a single radio base station that can be either the first radio base station 12 or the second radio base station 13. As stated above the first radio base station 12 may be a MeNB and the second radio base station 13 may be an SeNB. Shown in FIG. 4 and called "Option 1", a particular EPS bearer is routed from a serving gateway (S-GW) 41 to the wireless device either via the first radio base station 12 or via the second radio base station 13 directly. In "Option 2" all the traffic, i.e., all EPS bearers are first routed to the first radio base station 12. Then traffic of EPS bearers are sent to the wireless device 10 either via the first base station 12 or second radio base station 13.

2. Intra-bearer split dual connectivity. In this alternative, data of a single EPS bearer may be transmitted over different radio base stations, that is, data is split over multiple radio base stations. This may be achieved e.g. by routing all traffic to the first radio base station 12 and then forwarding some of the packets of certain bearer over the second radio base station 13 as shown in "Option 3" and some packets directly to the wireless device 10.

Figure 4:
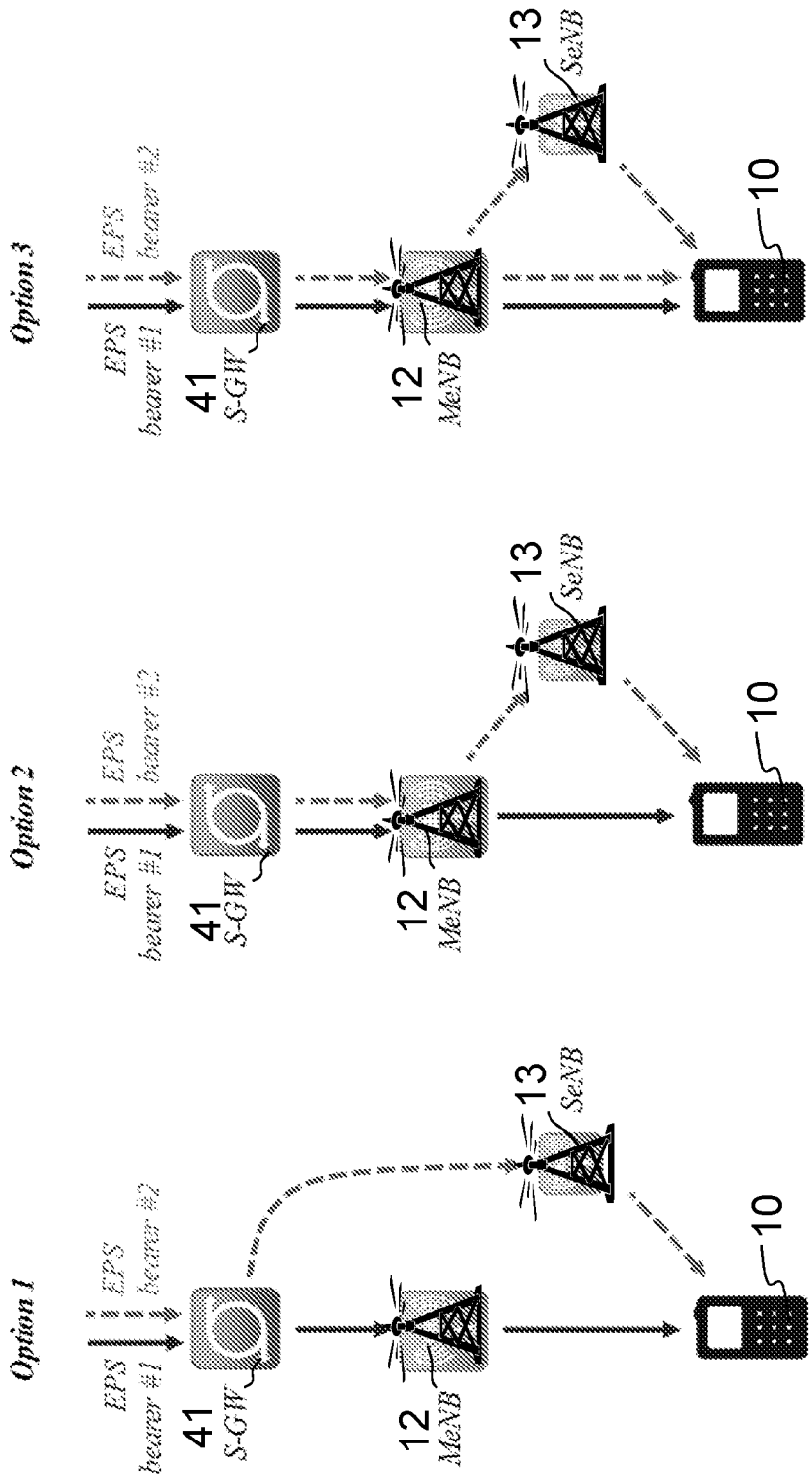
FIG. 4 shows User plane options.

The different schemes are depicted in FIG. 4. In the "Option 1", the traffic split is done per EPS bearer, EPS bearer #1 and EPS bearer #2, and traffic of each EPS bearer is directly routed from the S-GW 41 to the wireless device 10 either via the first base station 12 or the second base station 13. In "Option 2", also traffic split is done per EPS bearer. The difference is that all bearers are routed over the first radio base station 12. Finally in "Option 3", there are some bearers routing over the first radio base station 12 directly to the wireless device 10 and some of the bearers of the EPS bearers #2 are split over the first radio base station 12 and the second radio base station 13.

Figure 5:
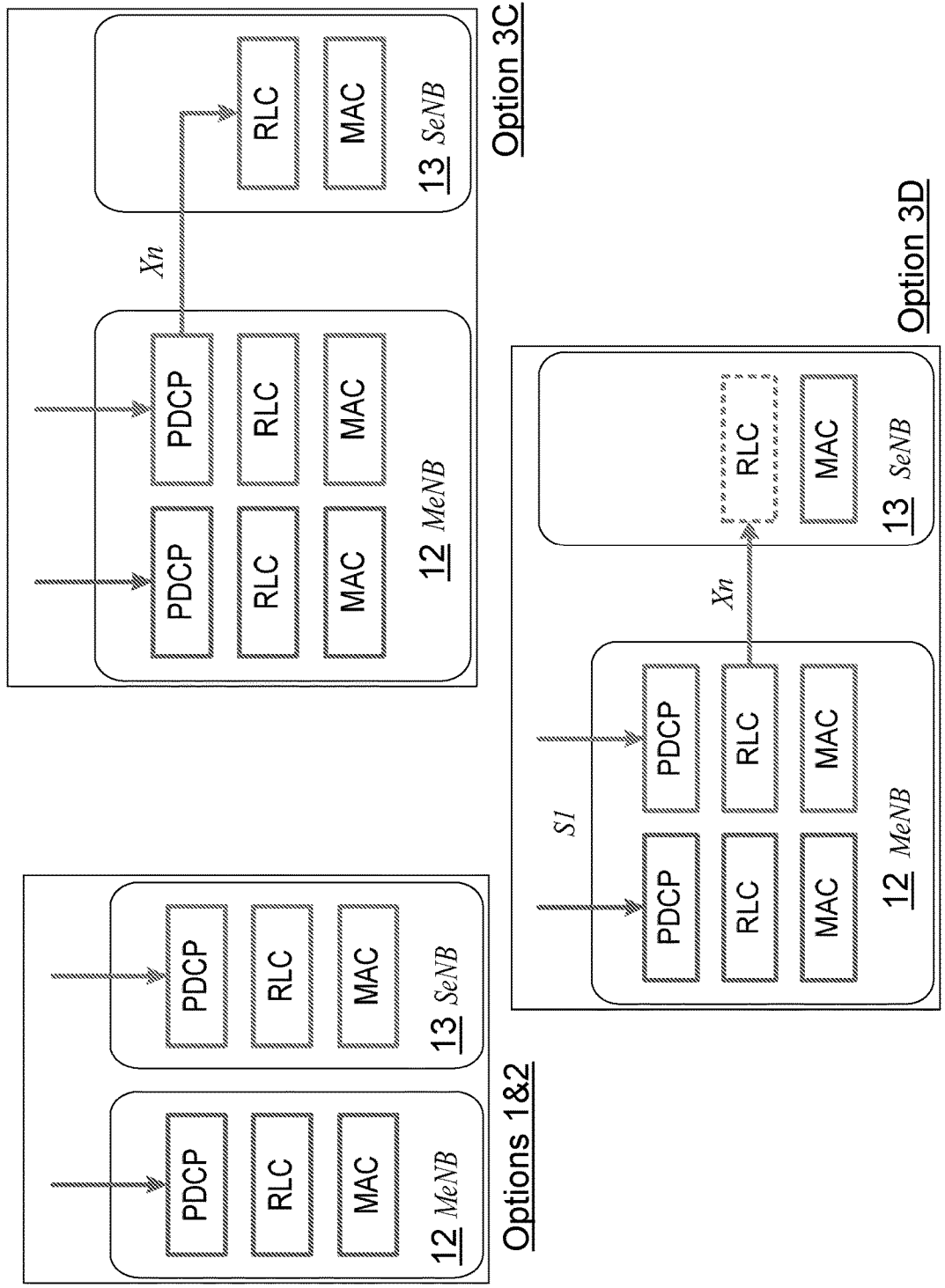
FIG. 5 shows L2 protocol stack options for different user plane options 1A/2A, 3C and 3D.

The possible L2 protocol stack for Option 1 and 2 is depicted in top left of FIG. 5. It should be noted that all L2 protocols terminate in one radio base station only, either the first radio base station 12 or the second radio base station 13. Then in the right hand side of FIG. 5 and the bottom of FIG. 5, potential protocol stacks for Option 3, called "intra-bearer split", are depicted. In the protocol stack on the right hand side, denoted as Option 3C, for split bearers there is one PDCP entity in the first radio base station 12 whereas traffic is split under the PDCP layer meaning that there are different RLC entities in the each radio base station. In the protocol stack in the bottom of FIG. 5, denoted as Option 3D, traffic is split in the RLC layer in such way that RLC entity in the first radio base station 12 handles some functions like reordering and then a slave RLC entity in the second radio base station 13 handles some other functions like re-segmentation of RLC Protocol Data Units (PDU) to fit to the transport blocks provided by the Medium Access Control (MAC)/Physical (PHY) layer. Thus, FIG. 5 discloses L2 protocol stack options for different user plane options, such as Options 1 and 2, also called option 1A and option 2A, and Options 3C and 3D.

As part of developing embodiments herein a problem has been identified in that a current mechanism of buffer status reporting is not sufficient when considering dual connectivity operation as the current mechanism is intended to be used with one connection only. Embodiments herein disclose a mechanism to report buffer status in the dual connectivity scenario.

In FIG. 5, it can be seen that there are two types of bearers:

1. A first type. Bearers being transmitted over one radio base station. In architecture Options 1 and 2, the bearers can be mapped to either the first radio base station 12 or the second radio base station 13, whereas in architecture of Option 3C and Option 3D, these type of bearers can be mapped only to the first radio base station 12.

2. A second type. Bearers split over multiple radio base stations. The packets of these bearers may be sent over the second radio base station 13 and/or the first radio base station 12.

The first type bearers are herein called "eNB-specific bearers" and the second type of bearers are herein called "split bearers".

Furthermore, it should be assumed that all Radio Link Control acknowledged mode (RLC AM) bearers are two-directional as UL is needed at least for RLC control information with all User Plane (UP) architectures except with architecture Option 3D.

It should be noted that in the following description, embodiments and/or rules for buffer status reporting may be described either in the terms of bits or bytes.

Figure 6:
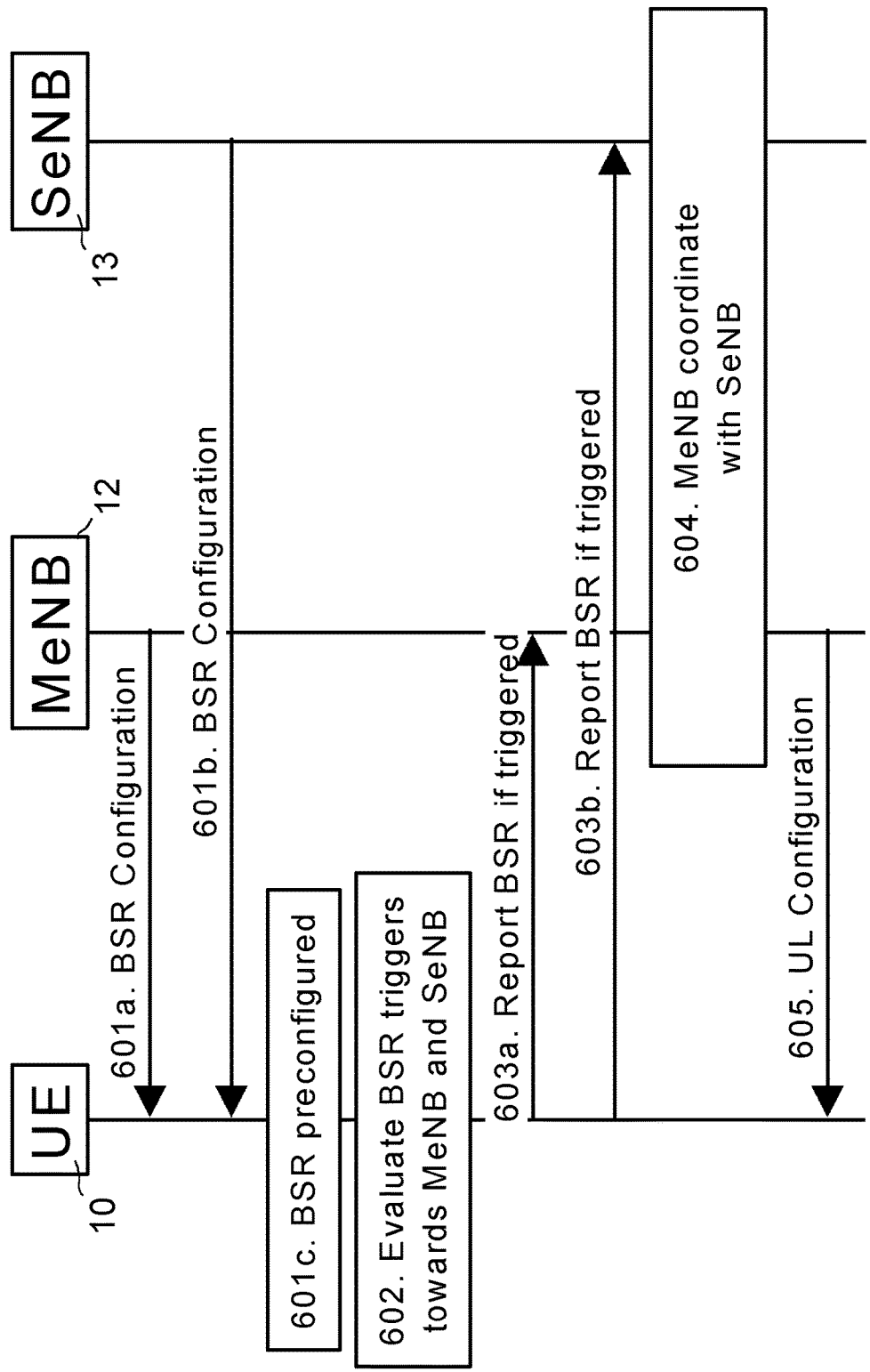
FIG. 6 shows a signaling chart for dual connectivity buffer status reporting according to embodiments herein.

In general, a reconfigurable buffer status reporting procedure for both eNB specific bearers and split bearers is illustrated by FIG. 6. FIG. 6 shows a signalling chart for dual connectivity buffer status reporting. One of the serving radio base stations, the first radio base station 12 or the second radio base station 13, or both may configure buffer status reporting, or the buffer status reporting may be pre-configured.

Action 601*a*. For dual connectivity, according to some embodiments, the first radio base station 12 called MeNB configures the BSR at the wireless device 10 by transmitting to the wireless device 10, a BSR configuration for the first and/or the second radio base station 12,13.

Action 601*b*. Alternatively, or additionally, the second radio base station 13 called SeNB may configure the BSR for the second radio base station 13 and/or the first radio base station 12. Hence, the second radio base station 13 may transmit BSR configuration to the wireless device 10 for the first radio base station 12 and/or the second radio base station 13.

Action 601*c*. Alternatively, the wireless device 10 may be preconfigured with the BSR configuration for one or both of the radio base stations 12,13.

Action 602. The wireless device 10 evaluates or monitors, in action 602, BSR triggers towards the first radio base station 12 and the second radio base station 13 as described in detail in different embodiments in the sequel. E.g. monitor whether a trigger condition is fulfilled regarding one of the radio base stations or not.

Action 603*a*. If a BSR is triggered towards one or more of the serving radio base stations, then the BSR is sent to the respective radio base station. Thus, the wireless device 10 may report BSR to the first radio base station 12 if triggered. The content of the BSR is also described in detail in the different embodiments below.

Action 603*b*. Additionally or alternatively, the wireless device 10 may report BSR to the second radio base station 13 if triggered.

Action 604. In some embodiments, the first radio base station 12 and the second radio base station 13 may then coordinate scheduling decisions for UL transmission from the wireless device 10 based on the received BSR. Otherwise there is a risk that the wireless device 10 is scheduled over multiple cells and radio resources are wasted.

Action 605. For example, the first radio base station 12 may then schedule the wireless device 10 and transmit an UL scheduling grant to the wireless device 10 based on the coordinated scheduling decision.

Procedures for eNB-Specific Bearers, "Option 1" and "Option 2" Above

For the eNB-specific bearers or radio base station specific bearers, the goal is that all data of those bearers are transmitted and scheduled over one radio base station. Let us first consider BSR triggering and reporting. Currently BSRs are per logical channel group. It may be made sure that correct radio base station receives the information of the buffered bytes, information also known as BSR, for a certain bearer. For this, following solutions may be used:

Allocate, at the wireless device 10, bearers of different radio base stations to different logical channel groups When reporting buffer status, the wireless device 10 considers which bearers belong to which radio base station and builds BSRs correspondingly. Hence, first the wireless device 10 checks which bearers are mapped to a certain radio base station and then includes data amount of these bearers in the BSR towards that radio base station.

After triggering the BSR, SR is typically triggered. To make the correct radio base station to be aware of incoming bits, SR may be sent towards the radio base station for which the BSR is relevant.

When the wireless device 10 receives a grant from the relevant radio base station, then it may report the BSR with it. To minimize the user plane delay, it is beneficial that the BSR ends up to the correct radio base station. Thus, a new logic is introduced to map a BSR Medium Access Control (MAC) Control Element to the correct Physical Layer (PHY) grant provided for the given bearer. In addition, when the wireless device 10 receives a grant for data, then also usage of grant provided by a given radio base station is limited to the corresponding bearer. This is different as compared to intra-eNB Carrier Aggregation (CA), where it is up to wireless device implementation how grants are used. Association between grants of physical layer resources of one base station and bearers corresponding to the same base station may be done semi-permanently with Radio Resource Control (RRC) configuration.

Procedures for Split Bearers, Options 3C and 3D Above

The UL scheduling and buffer status reporting are more complex with split bearers. In this scenario, the first question is how BSRs and SRs are triggered and towards which radio base station the BSRs and SRs are sent. After that one or two radio base stations may schedule the wireless device 10 with the UL grants. The second open question is: when the wireless device 10 has received a grant, how does the wireless device 10 map data to the grant?

Starting with BSR triggering, the following solutions are described as embodiments disclosed herein:

Solution 1) All BSRs and SRs are triggered and sent towards all radio base stations, relevant for split bearers, e.g. the first radio base station 12 and the second radio base stations 13.

Solution 2) BSR and SR are triggered and sent towards one radio base station only, for example the first radio base station 12 being exemplified above as the master radio base station (MeNB).

Solution 3) BSR and SR are triggered and sent toward one radio base station or two radio base stations based on one or more predefined rules.

The first option, Solution 1, is non-complex from a wireless device point of view. A network implementation may be provided on how to schedule the wireless device 10. However, the issue with this option, Solution 1, is that the second radio base station 13 and the first radio base station 12 need to coordinate before scheduling resources for the wireless device 10. Otherwise there is a risk that the wireless device 10 is scheduled over multiple cells and radio resources are wasted, called a double scheduling problem. See action 604 above.

In the second option, Solution 2, the double scheduling problem is avoided as only one radio base station is responsible for handling BSRs and SRs. Even in this case, scheduling over the second radio base station 13 could be possible if scheduling information is forwarded from the first radio base station 12 to the second radio base station 13. However, the limitation of this approach is that some packets that are needed in the second radio base station 13 are delayed in case the first radio base station 12 handles the BSRs and SRs. An example of such data is RLC Status Report for the RLC entity of the second radio base station 13 in e.g. Architecture option 3C. It would be more efficient to report and transmit those RLC Status reports directly to the second radio base station 13 than to forward the packet or BSR over the backhaul via the first radio base station 12.

In the third option, Solution 3, there are one or more predefined rules how BSRs and SRs are triggered and transmitted. The rules may be one or more of the following:

One rule may be that the BSR due to RLC Status Report is triggered and transmitted to the radio base station terminating the corresponding RLC. This makes sure that the control information is received with the minimum delay in the right radio base station. In addition, bytes related to RLC retransmissions are reported to the radio base station terminating the corresponding RLC. Bytes pertaining to new uplink data transmission is reported directly to e.g. the first radio base station 12.

An alternative or additionally rule may be that when the UL buffer exceeds a given threshold X, the BSRs are sent to multiple radio base stations, e.g. the first and second radio base station. Otherwise the BSRs are only sent to the first radio base station 12.

a. In one mode, the wireless device 10 receives from one of the serving radio base stations, for example the first radio base station 12 a rule configuration how to trigger the BSR.

b. The rule configuration or a BSR triggering rule may be different for different radio base stations and/or logical channel groups. For example, there may be one threshold Xm for triggering BSR reports to the first radio base station 12 and one threshold Xs for triggering BSR reports to the second radio base station 13. A BSR towards a radio base station may be triggered only when the buffer size is over the threshold of this base station. The Xm and Xs may be the same or different.

c. The rule configuration or the BSR triggering rule may be considering different bits in the UL buffer, as configured from one of the serving radio base stations, for example the first radio base station 12. One example is to consider all bits 'B' in an UL buffer of the wireless device 10. Another example is to consider a fraction Ym of the bits in the UL buffer for evaluating BSR triggering towards the first radio base station 12 and a fraction Ys of the bits in the UL buffer evaluating BSR triggering towards the second radio base station 13.

d. The considered bits and triggering rules may be further separately configured per bearer and/or logical channel group.

Yet another rule may be that Transmission Control Protocol (TCP) acknowledgements are reported and sent directly to the first radio base station 12. By this way, a TCP roundtrip time is minimized as it avoids forwarding TCP ACKs over the backhaul between second radio base station 13 and the first radio base station 12. Other payload data may be sent to the second radio base station 13 as well.

Then when BSR is triggered, it is preferable to send SR only to the radio base station for which BSR was triggered e.g. the second radio base station 13. Usage of the initial grant may follow BSR reporting. E.g. if the BSR for the RLC Status report is sent towards the second radio base station 13, then also actual data may be sent towards that second radio base station 13 when the wireless device 10 is scheduled with UL resources. By this way, a situation where the wireless device 10 makes transmission towards wrong radio base station resulting in a potential padding, is avoided.

We note that for padding BSR and periodic BSR there may be exceptions. For example, padding and periodic BSRs could be sent only to the one radio base station or alternatively, padding and periodic BSRs could be sent to all radio base stations.

Content of the Buffer Status Report for Split Bearers

In case a buffer status is sent to many radio base stations there can be additional rules what to report to each radio base station.

1. Report all bits of a given bearer/logical channel to all radio base stations. Then it is up to radio base stations to coordinate how to schedule the wireless device 10. There can be exceptions for RLC status reports and retransmissions, e.g. exclude bits related to RLC status reports and retransmissions 2. Report all bits of a given bearer/logical channel to all radio base stations, but indicate in the BSR what bits have been reported to the other radio base station. Then the other radio base station, e.g. the second radio base station 13, knows what another radio base station, e.g. the first radio base station 12, may schedule.

3. Report a fraction Z of the total number of bits of a given bearer/logical channel to one radio base station and rest of the bits to another radio base station. Fractions how to split the total no of bits may be configured by the network, for example by the first radio base station 12. For example, fraction Zm of the bits are reported to the first radio base station, while fraction Zs of the bits are reported to the second radio base station 13. In addition, bits reported to one radio base station may also be reported to a different radio base station as described above. Alternatively, the estimated link rate and throughput may be utilized when determining the fraction how to split the bits. In addition, there can be new rules where new data would be reported to the first radio base station 12 and RLC Status report and retransmission related data to the second radio base station 13.

Figure 7:
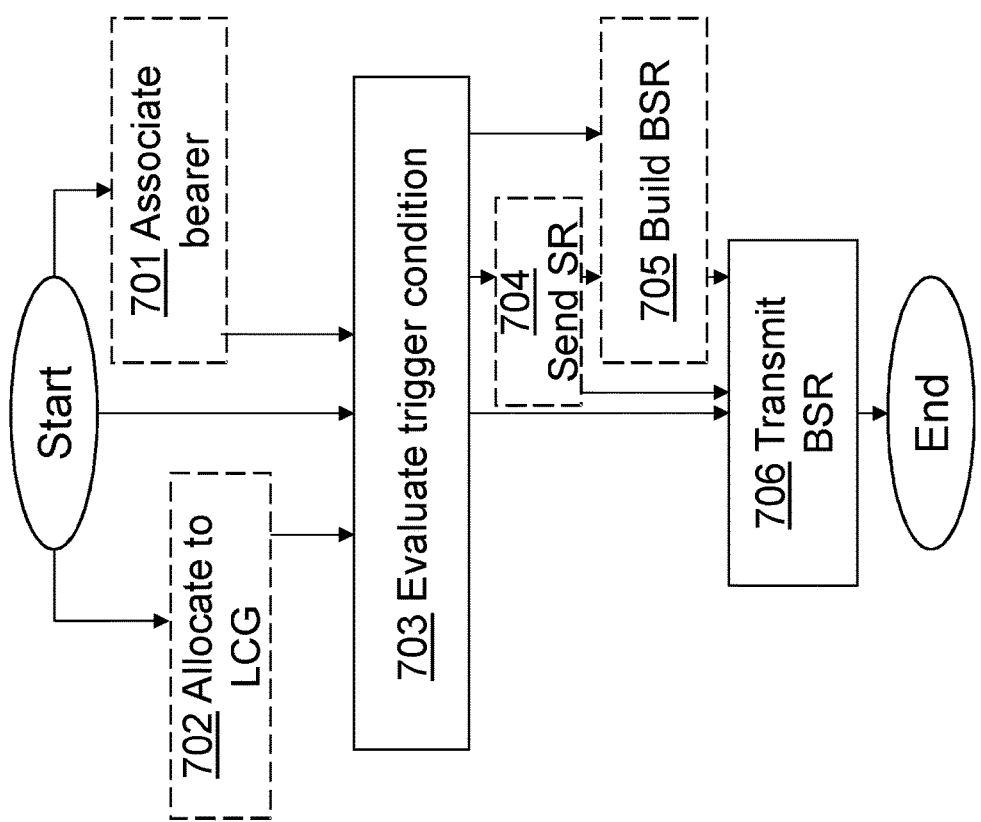
FIG. 7 is a flowchart depicting a method in a wireless device according to embodiments herein.

The method actions in the wireless device 10 for handling data transmissions in a radio communications network according to some embodiments will now be described with reference to a flowchart depicted in FIG. 7. The actions do not have to be taken in the order stated below, but may be taken in any suitable order. Actions performed in some embodiments are marked with dashed boxes.

Action 701. The wireless device 10 may associate a bearer with one of the radio base stations, or the associate a bearer with both the radio base stations. This may be done by a configuration from the first radio base station 12 and/or the second radio base station.

Action 702. The wireless device 10 may allocate a bearer of one of the radio base stations to a logical channel group. E.g. first the first radio base station 12 and/or the second radio base station 13 makes an actual allocation of the bearer to the logical channel group by configuration and then the wireless device 10 makes a corresponding allocation or association of the bearer and the radio base station.

Action 703. When the wireless device 10 is served by the first radio base station 12 and the second radio base station 13 providing dual connectivity to the wireless device 10 in the radio communications network 1, the wireless device 10 evaluates whether a trigger condition is fulfilled. The trigger condition may state that the buffer status reporting due to a Radio Link Control, RLC, Status Report or a retransmission is triggered and transmitted towards the radio base station terminating a corresponding RLC layer. The trigger condition may state that when an uplink buffer of the wireless device 10 exceeds a given threshold X, the buffer status report is sent to the first and second radio base stations, otherwise the buffer status report is only transmitted to the first radio base station 12. The trigger condition may be considering a fraction of bits in an uplink buffer to trigger the buffer status reporting. The trigger condition may be different for the first radio base station 12 and the second radio base station 13.

Action 704. In some embodiments the wireless device 10 transmits a SR to only the radio base station for which the buffer status reporting was triggered.

Action 705. The wireless device 10 may then build a buffer status report for the radio base station or radio base stations associated with the bearer.

Action 706. When the trigger condition is fulfilled, the wireless device 10 transmits a buffer status report to the first radio base station 12 and/or the second radio base station 13. In some embodiments the wireless device 10 transmits buffer status report to the one radio base station associated with the bearer or both radio base stations associated with the bearer. In some embodiments the buffer status report is sent to one radio base station associated with the logical channel group. The buffer status report may only be transmitted to the first radio base station 12, or the buffer status report may be transmitted both to the first radio base station 12 and the second radio base station 13. The wireless device may only send a scheduling request to the radio base station for which buffer status report was triggered.

The buffer status report may comprise one or more out of:
- all bits of bearers/logical channels of a given radio base station,
- indication in the buffer status report indicating which bits have been reported to another radio base station;
- a fraction of a total number of bits of all bearers/logical channels to one radio base station and rest of the bits to another radio base station.

Figure 8:
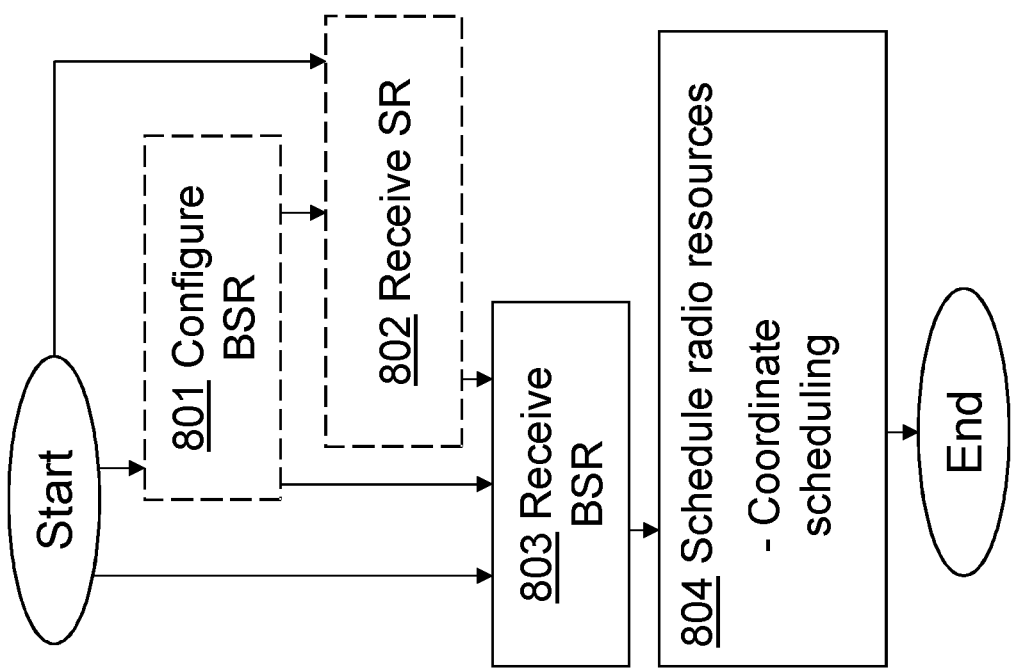
FIG. 8 is a flowchart depicting a method in a first radio base station according to embodiments herein.

The method actions in the first radio base station 12 for handing data transmissions in the radio communications network according to some embodiments will now be described with reference to a flowchart depicted in FIG. 8. The actions do not have to be taken in the order stated below, but may be taken in any suitable order. Actions performed in some embodiments are marked with dashed boxes. The radio communications network 1 comprises the first radio base station 12 and a second radio base station 13).

Action 801. The first radio base station 12 may configure the wireless device 10 for communication with both the first and second radio base station to provide the dual connectivity. The first radio base station 12 may configure the wireless device 10 with a rule configuration how to trigger the buffer status report, allocation of the bearers to the radio base stations as well as allocation of the bearers to the logical channel groups.

Action 802. The first radio base station 12 may receive a SR from the wireless device 10 and then schedule the wireless device 10 with an initial grant.

Action 803. The first radio base station 12 receives, when the first radio base station 12 and the second radio base station 13 provide dual connectivity to a wireless device 10 in the radio communications network 1, a buffer status report from the wireless device 10.

Action 804. The first radio base station schedules radio resources to the wireless device 10 based on the received buffer status report by coordinating information associated with the received buffer status report with the second radio base station 13 before scheduling resources to the wireless device 10.

Figure 9:
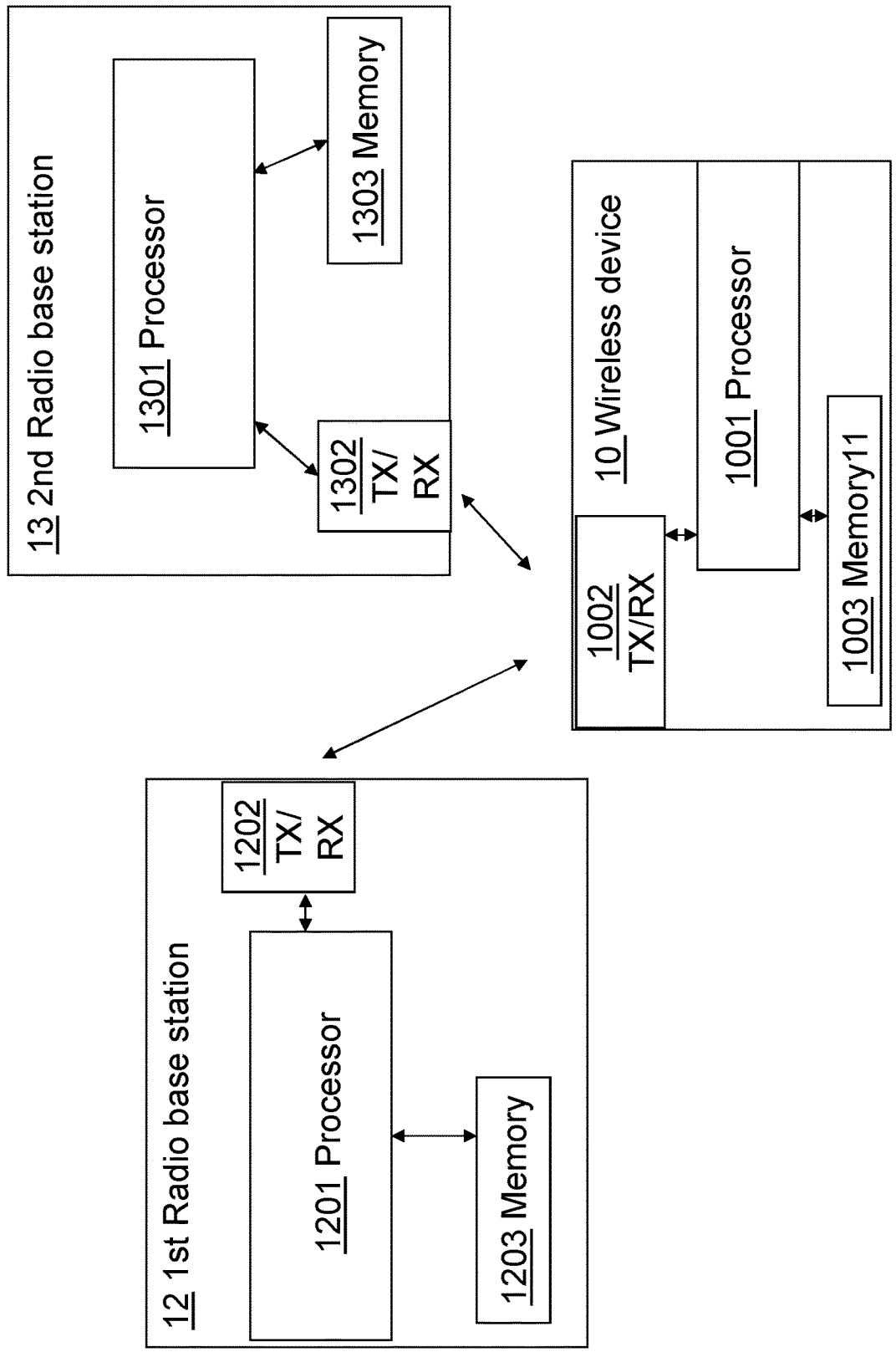
FIG. 9 is a block diagram depicting a wireless device, a first radio base station, a second radio base station according to embodiments herein.
Figure 10:
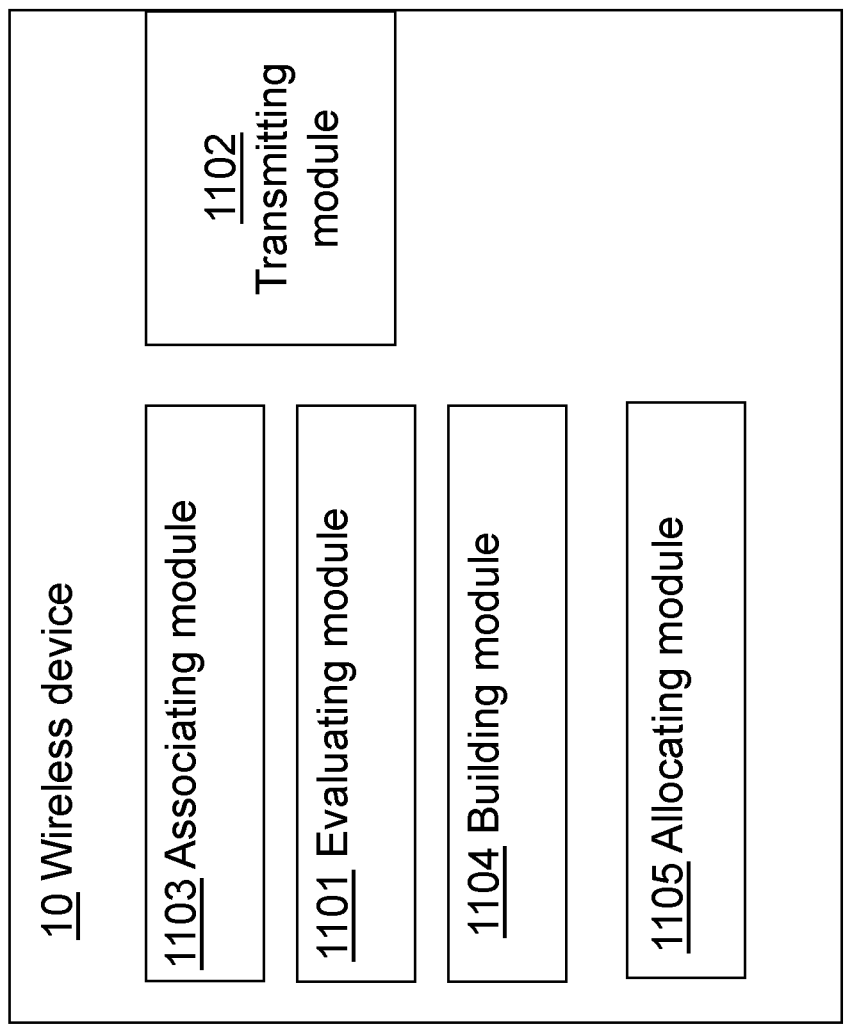
FIG. 10 is a block diagram depicting a wireless device according to embodiments herein.
Figure 11:
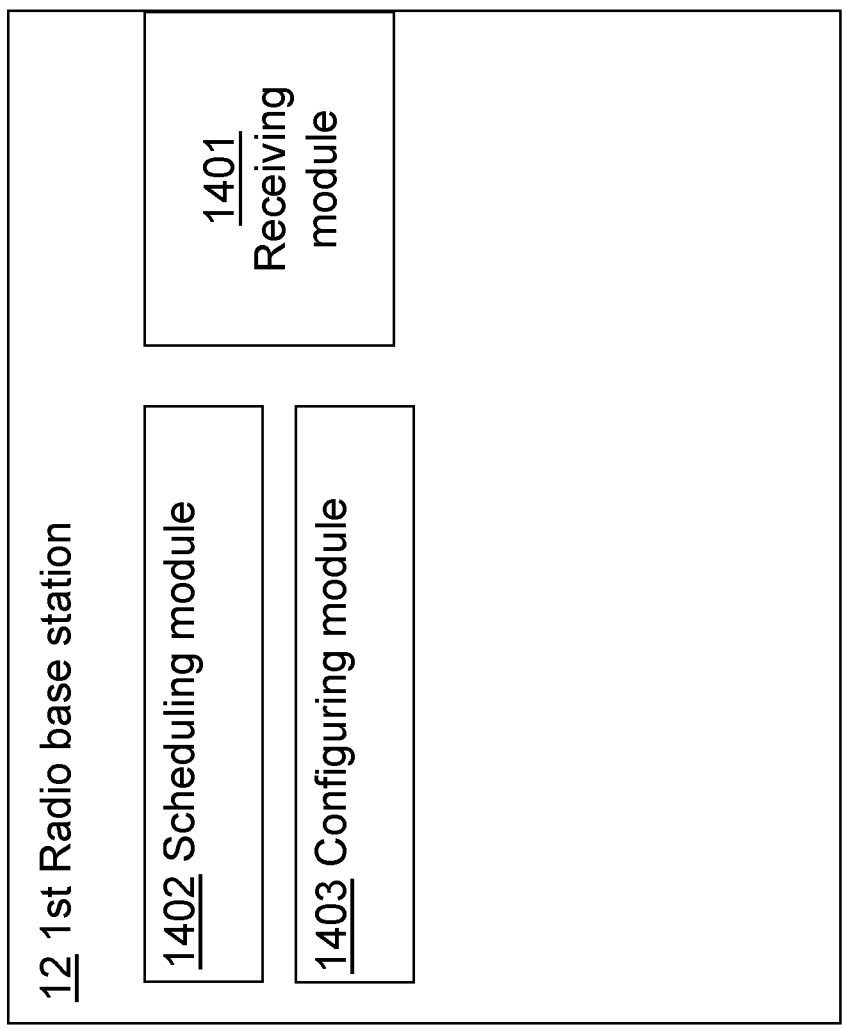
FIG. 11 is a block diagram depicting a a first radio base station according to embodiments herein.

According to embodiments herein a wireless device 10 is provided to perform methods herein. Furthermore a first radio base station 12 is provided. The first radio base station 12 may be a Master radio base station or a secondary radio base station. The secondary radio base station may be a low power node, i.e. lower power transmissions compared to the master radio base station. FIG. 9 is a block diagram depicting the first radio base station 12 and the wireless device 10 and also the second radio base station 13

The embodiments herein for managing or handling data transmissions may be implemented through one or more processors 1001 in the wireless device 10 depicted in FIG. 9, together with computer program code for performing the functions and/or method actions of the embodiments herein. The program code mentioned above may also be provided as a computer program product, for instance in the form of a data carrier carrying computer program code for performing embodiments herein when being loaded into the wireless device 10. One such carrier may be in the form of a CD ROM disc. It is however feasible with other data carriers such as a memory stick. The computer program code may furthermore be provided as pure program code on a server and downloaded to the wireless device 10.

The wireless device 10 comprises a transmitter TX and a receiver RX or a transceiver 1002 for receiving e.g. BSR configurations from one or both radio base stations. The transceiver 1002 is further for transmitting a buffer status report when being triggered. The BSR may be transmitted to the first and/or the second radio base station e.g. depending on a trigger condition has been fulfilled and type of bearer.

The wireless device 10 further comprises a memory 1003. The memory may be used to store BSR configuration, buffer status, thresholds, trigger conditions, application to perform the methods herein etc.

The embodiments herein for managing or handling data transmissions may be implemented through one or more processors 1201 in the first radio base station 12 depicted in FIG. 9, together with computer program code for performing the functions and/or method actions of the embodiments herein. The program code mentioned above may also be provided as a computer program product, for instance in the form of a data carrier carrying computer program code for performing embodiments herein when being loaded into the first radio base station 12. One such carrier may be in the form of a CD ROM disc. It is however feasible with other data carriers such as a memory stick. The computer program code may furthermore be provided as pure program code on a server and downloaded to the first radio base station 12.

The first radio base station 12 comprises a transmitter TX and a receiver RX or a transceiver 1202 for transmitting e.g.

BSR configurations to the wireless device 10. The transceiver 1202 is further configured for receiving a buffer status report when being triggered at the wireless device 10.

The first radio base station 12 further comprises a memory 1203. The memory may be used to store BSR configuration, buffer status, thresholds, trigger conditions, application to perform the methods herein etc.

As will be readily understood by those familiar with communications design, that functions from other circuits may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless terminal or network node, for example.

Alternatively, several of the functional elements of the processing circuits discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications receivers will appreciate the cost, performance, and maintenance tradeoffs inherent in these design choices.

The embodiments herein for managing or handling data transmissions may be implemented through one or more processors 1301 in the second radio base station 13 depicted in FIG. 9, together with computer program code for performing the functions and/or method actions of the embodiments herein. The program code mentioned above may also be provided as a computer program product, for instance in the form of a data carrier carrying computer program code for performing embodiments herein when being loaded into the second radio base station 13. One such carrier may be in the form of a CD ROM disc. It is however feasible with other data carriers such as a memory stick. The computer program code may furthermore be provided as pure program code on a server and downloaded to the second radio base station 13.

The second radio base station 13 comprises a transmitter TX and a receiver RX or a transceiver 1302 for transmitting e.g. BSR configurations to the wireless device 10. The transceiver 1302 is further configure for receiving a buffer status report when being triggered at the wireless device 10.

The second radio base station 13 further comprises a memory 1303. The memory may be used to store BSR configuration, buffer status, thresholds, application to perform the methods herein etc.

According to embodiments herein it is provided a mechanism to report buffer status in the dual connectivity scenario.

According to an aspect of embodiments herein the object is achieved by providing a method in a user equipment for managing or handling data transmissions in a radio communications network. The user equipment is served by a first radio base station and a second radio base station providing dual connectivity to the user equipment in the radio communications network. The user equipment transmits a buffer status report to the first and/or second radio base station when a trigger is being fulfilled.

According to another aspect embodiments herein achieve the object by providing a method in a radio base station. The radio base station is comprised in a radio communications network. The radio communications network comprises a second radio base station. The first and second radio base station provides dual connectivity to a user equipment in the radio communications network. Thus, the first radio base station and the second radio base station have bearers established to the user equipment for carrying data traffic to the user equipment, or the first and second radio base station serve the user equipment. The first radio base station receives a buffer status report from the user equipment. The first radio base station then coordinate with the second radio base station before scheduling data to the UE. Otherwise there is a risk that UE is scheduled over multiple cells and resources are wasted.

A wireless device and a first radio base station are also provided herein.

An advantage with embodiments herein is to provide means for buffer status reporting and uplink scheduling in dual connectivity scenario, resulting in an improved performance in an efficient manner.

In order to perform the method herein the wireless device 10 is provided for handling data transmissions in the radio communications network 1. The wireless device 10 is configured to be served by the first radio base station 12 and the second radio base station 13 providing dual connectivity to the wireless device 10 in the radio communications network 1.

The wireless device 10 may comprise an evaluating module 1101. The wireless device 10, the processor 1001 and/or the evaluating module 1101 may be configured, when the wireless device 10 is served by the first and second radio base station, to evaluate whether a trigger condition for buffer status reporting is fulfilled.

The wireless device 10 may further comprise a transmitting module 1102. The wireless device 10, the processor 1001 and/or the transmitting module 1102 may be configured when the trigger condition is fulfilled to transmit a buffer status report to the first radio base station 12 and/or the second radio base station 13. The wireless device 10, the processor 1001 and/or the transmitting module 1102 may be configured to transmit the buffer status report only to the first radio base station 12. Alternatively, the wireless device 10, the processor 1001 and/or the transmitting module 1102 may be configured to transmit the buffer status report both to the first radio base station 12 and the second radio base station 13.

The wireless device 10 may further comprise an associating module 1103. The wireless device 10, the processor 1001 and/or the associating module 1103 may be configured to associate a bearer with one of the radio base stations. The wireless device 10, the processor 1001 and/or the associating module 1103 may be configured to associate a bearer with both the radio base stations;

The wireless device 10 may further comprise a building module 1104. The wireless device 10, the processor 1001 and/or the building module 1104 may be configured to build a buffer status report towards the radio base station associated with the bearer when the trigger condition is met. The wireless device 10, the processor 1001 and/or the transmitting module 1102 may then be configured to transmit the buffer status report to the radio base station associated with the bearer. The wireless device 10, the processor 1001 and/or the building module 1104 may be configured to build a buffer status report towards both the radio base stations associated with the bearer when the trigger condition is met. The wireless device 10, the processor 1001 and/or the transmitting module 1102 may then be configured to transmit the buffer status report to both radio base stations associated with the bearer.

The wireless device 10 may further comprise an allocating module 1105. The wireless device 10, the processor 1001 and/or the allocating module 1105 may be configured to allocate a bearer of one of the radio base stations to a logical channel group. The wireless device 10, the processor 1001 and/or the transmitting module 1102 may then be configured to transmit buffer status report to one radio base station associated with the logical channel group.

The trigger condition may state that the buffer status reporting due to a Radio Link Control, RLC, Status Report or a retransmission is triggered and transmitted towards the radio base station terminating a corresponding RLC layer. The trigger condition may state that when an uplink buffer of the wireless device 10 exceeds a given threshold X, the buffer status report is sent to the first and second radio base stations, otherwise the buffer status report is only transmitted to the first radio base station 12. In some embodiments the trigger condition is considering a fraction of bits in an uplink buffer to trigger the buffer status reporting. The trigger condition may be different for the first radio base station 12 and the second radio base station 13.

The buffer status report may comprise one or more of:
all bits of bearers/logical channels for the given radio base station;
indication in the buffer status report indicating which bits have been reported to another radio base station;
a fraction of a total number of bits of all bearers/logical channels to one radio base station and a rest of the bits to another radio base station.

In order to perform the method herein the first radio base station 12 is provided for handling data transmissions in a radio communications network 1. The radio communications network 1 comprises the first radio base station 12 and the second radio base station 13.

The first radio base station 12 may comprise a receiving module 1401. The first radio base station 12, the processor 1201 and/or the receiving module 1401 may be configured to receive, when the first radio base station 12 and the second radio base station 13 provide dual connectivity to a wireless device 10 in the radio communications network 1, the buffer status report from the wireless device 10.

The first radio base station 12 may comprise a scheduling module 1402, a scheduler. The first radio base station 12, the processor 1201 and/or the scheduling module 1402 may be configured to schedule radio resources to the wireless device 10 based on the received buffer status report by coordinating information associated with the received buffer status report with the second radio base station 13 before scheduling resources to the wireless device 10.

The first radio base station 12 may comprise a configuring module 1403. The first radio base station 12, the processor 1201 and/or the configuring module 1403 may be arranged to configure the wireless device 10 for communication with both the first and second radio base station to provide the dual connectivity. The first radio base station 12, the processor 1201 and/or the configuring module 1403 may be arranged to configure the wireless device 10 with a rule configuration how to trigger the buffer status report.

It will be appreciated that the foregoing description and the accompanying drawings represent non-limiting examples of the methods and apparatus taught herein. As such, the inventive apparatus and techniques taught herein are not limited by the foregoing description and accompanying drawings. Instead, the embodiments herein are limited only by the following claims and their legal equivalents.

The invention claimed is:

1. A method for use in a wireless device for handling data transmissions in a radio communications network, the method being characterized in that when the wireless device is served by a first radio base station and a second radio base station providing dual connectivity to the wireless device in the radio communications network the method comprises:
evaluating whether a trigger condition for buffer status reporting is fulfilled, wherein the trigger condition states that when an uplink buffer of the wireless device exceeds a given threshold X, the buffer status report is sent to the first and second radio base stations, otherwise the buffer status report is only transmitted to the first radio base station; and
transmitting a buffer status report, when the uplink buffer exceeds the given threshold, to the first radio base station and the second radio base station or, when uplink buffer is equal or below the threshold, to the first radio base station;
wherein the buffer status report comprises one or more of:
all bits of bearers/logical channels relevant to the first and second radio base stations;
indication in the buffer status report indicating which bits have been reported to each of the first and second radio base stations, respectively; and
a fraction of a total number of bits of all bearers/logical channels to the first radio base station and the remaining fraction of the total number of bits to the second radio base station.

2. A method according to claim 1, wherein the trigger condition is considering a fraction of bits in the uplink buffer to trigger the buffer status reporting.

3. A method for use in a first radio base station for handling data transmissions in a radio communications network, which radio communications network comprises the first radio base station and a second radio base station; the method comprising:
configuring the wireless device with a rule configuration how to trigger the buffer status report; which rule configuration states that when an uplink buffer of the wireless device exceeds a given threshold X, the buffer status report is sent to the first and the second radio base stations, otherwise the buffer status report is only transmitted to the first radio base station;
receiving, when the first radio base station and the second radio base station provide dual connectivity to a wireless device in the radio communications network, a buffer status report from the wireless device; and
scheduling radio resources to the wireless device based on the received buffer status report, wherein the scheduling further comprising coordinating information associated with the received buffer status report with the second radio base station before scheduling radio resources to the wireless device;
wherein the buffer status report comprises one or more of:
all bits of bearers/logical channels relevant to the first and second radio base stations;
indication in the buffer status report indicating which bits have been reported to each of the first and second radio base stations, respectively; and
a fraction of a total number of bits of all bearers/logical channels to the first radio base station and the remaining fraction of the total number of bits to the second radio base station.

4. A method according to claim 3, further comprising configuring the wireless device for communication with both the first and second radio base station to provide the dual connectivity.

5. A wireless device for handling data transmissions in a radio communications network, the wireless device is configured to be served by a first radio base station and a second radio base station providing dual connectivity to the wireless device in the radio communications network, the wireless device comprising:
one or more processors configured to evaluate whether a trigger condition for buffer status reporting is fulfilled, wherein the trigger condition states that when an uplink buffer of the wireless device exceeds a given threshold X, the buffer status report is sent to the first and second radio base stations, otherwise the buffer status report is only transmitted to the first radio base station; and
a transceiver configured to transmit a buffer status report to the first radio base station and the second radio base station when the uplink buffer of the wireless device exceeds the given threshold X, and to the first radio base station when the uplink buffer is equal or below the threshold;
wherein the buffer status report comprises one or more of:
all bits of bearers/logical channels relevant to the first and second radio base stations;
indication in the buffer status report indicating which bits have been reported to each of the first and second radio base stations, respectively; and
a fraction of a total number of bits of all bearers/logical channels to the first radio base station and the remaining fraction of the total number of bits to the second radio base station.

6. A wireless device according to claim 5, wherein the trigger condition is considering a fraction of bits in an uplink buffer to trigger the buffer status reporting.

7. A first radio base station for handling data transmissions in a radio communications network, which radio communications network comprises the first radio base station and a second radio base station; the first radio base station comprising:
one or more processors configured to configure the wireless device with a rule configuration how to trigger a buffer status report, which rule configuration states that when an uplink buffer of the wireless device exceeds a given threshold X, the buffer status report is sent to the first and the second radio base stations, otherwise the buffer status report is only transmitted to the first radio base station;
a transceiver configured to receive, when the first radio base station and the second radio base station provide dual connectivity to a wireless device in the radio communications network, the buffer status report from the wireless device; and
wherein the one or more processors are further configured to schedule radio resources to the wireless device based on the received buffer status report by coordinating information associated with the received buffer status report with the second radio base station before scheduling resources to the wireless device;
wherein the buffer status report comprises one or more of:
all bits of bearers/logical channels relevant to the first and second radio base stations;
indication in the buffer status report indicating which bits have been reported to each of the first and second radio base stations, respectively; and
a fraction of a total number of bits of all bearers/logical channels to the first radio base station and the remaining fraction of the total number of bits to the second radio base station.

8. A first radio base station according to claim 7, further being arranged to configure the wireless device for communication with both the first and second radio base station to provide the dual connectivity.

* * * * *